United States Patent
Xu et al.

(10) Patent No.: US 12,112,139 B2
(45) Date of Patent: Oct. 8, 2024

(54) VOCABULARY GENERATION FOR NEURAL MACHINE TRANSLATION

(71) Applicant: Beijing Youzhuju Network Technology Co. Ltd., Beijing (CN)

(72) Inventors: Jingjing Xu, Beijing (CN); Chun Gan, Beijing (CN); Hao Zhou, Beijing (CN); Lei Li, Beijing (CN); Zaixiang Zheng, Beijing (CN)

(73) Assignee: Beijing Youzhuju Network Technology Co. Ltd., Beijing (CN)

( * ) Notice: Subject to any disclaimer, the term of this patent is extended or adjusted under 35 U.S.C. 154(b) by 387 days.

(21) Appl. No.: 17/535,365

(22) Filed: Nov. 24, 2021

(65) Prior Publication Data

US 2023/0161977 A1    May 25, 2023

(51) Int. Cl.
  *G06F 40/58*    (2020.01)
  *G06F 40/237*    (2020.01)
  *G06F 40/284*    (2020.01)

(52) U.S. Cl.
  CPC ............ *G06F 40/58* (2020.01); *G06F 40/237* (2020.01); *G06F 40/284* (2020.01)

(58) Field of Classification Search
  CPC .. G06F 16/2365; G06F 40/205; G06F 3/0608; G06F 3/0626; G06F 40/242
  See application file for complete search history.

(56) References Cited

U.S. PATENT DOCUMENTS

| | | | | |
|---|---|---|---|---|
| 7,983,902 B2* | 7/2011 | Wu | ........................ | G06F 40/258 704/10 |
| 2014/0207439 A1* | 7/2014 | Venkatapathy | ....... | G06F 40/274 704/4 |

(Continued)

FOREIGN PATENT DOCUMENTS

| | | |
|---|---|---|
| CN | 106649564 A | 5/2017 |
| CN | 109918658 A | 6/2019 |
| CN | 112464664 A | 3/2021 |
| JP | 2013-174995 A | 9/2013 |
| KR | 2004-0038559 A | 5/2004 |

OTHER PUBLICATIONS

International Patent Application No. PCT/CN2022/127198; Int'l Search Report and the Written Opinion; dated Jan. 6, 2023; 8 pages.
Xu et al.; "Vocabulary Learning via Optimal Transport for Neural Machine Translation"; Computational and Language; arXiv:2012.15671; Nov. 2021; 13 pages.

\* cited by examiner

*Primary Examiner* — Mark Villena
(74) *Attorney, Agent, or Firm* — BakerHostetler

(57) ABSTRACT

Implementations of the present disclosure relate to methods, devices, and computer program products for generating a destination vocabulary from a source vocabulary. In a method, a group of candidate vocabularies are determined from the source vocabulary based on a corpus, a size of a candidate vocabulary in the group of candidate vocabularies being different from a size of the source vocabulary. A group of marginal scores are obtained for the group of candidate vocabularies, respectively, a marginal score in the group of marginal scores being obtained for the candidate vocabulary based on a corpus entropy of the candidate vocabulary and a size of the candidate vocabulary. The destination vocabulary is selected from the group of candidate vocabularies based on the group of marginal scores. With these implementations, both of the corpus entropy and the vocabulary size are considered in the vocabulary generation, and thus a balance may be achieved therebetween, which may increase the performance of the generated vocabulary.

18 Claims, 6 Drawing Sheets

(56) References Cited

U.S. PATENT DOCUMENTS

| | | | | |
|---|---|---|---|---|
| 2015/0286632 A1* | 10/2015 | Meunier | ............... | G06F 40/51 |
| | | | | 704/2 |
| 2018/0203852 A1* | 7/2018 | Goyal | ............... | G06F 40/56 |
| 2018/0357531 A1* | 12/2018 | Giridhari | ............... | G06F 18/24 |
| 2019/0347323 A1* | 11/2019 | Riesa | ............... | G06F 40/232 |
| 2021/0110259 A1* | 4/2021 | Lee | ............... | G06N 20/20 |
| 2022/0343084 A1* | 10/2022 | Nagata | ............... | G06F 40/242 |
| 2022/0382978 A1* | 12/2022 | Wagner | ............... | G06F 40/284 |
| 2024/0013769 A1* | 1/2024 | Gemp | ............... | G10L 13/047 |

VOCABULARY GENERATION FOR NEURAL MACHINE TRANSLATION

FIELD

The present disclosure generally relates to vocabulary generation, and more specifically, to methods, devices and computer program products for determining a vocabulary via optimal transport for neural machine translation.

BACKGROUND

Nowadays, the neural machine translation becomes very popular and is widely used for translating texts written in one language into another. Before the translation, characters in the text should be first identified according to a predefined vocabulary. Here, the vocabulary may include multiple tokens and contents in the texts that exactly match the tokens may be identified. For example, if a vocabulary includes tokens such as "i" and "s," and a word "is" exists in text, the word "is" should be identified by two individual tokens "i" and "s." However, if the vocabulary further includes a token "is," the word may be identified as only one token "is." Therefore the vocabulary directly affects performance of the identifying procedure, which in turns affects the translating result. At this point, how to define a proper vocabulary becomes a hot focus.

SUMMARY

In a first aspect of the present disclosure, there is provided a method for generating a destination vocabulary from a source vocabulary. In a method, a group of candidate vocabularies are determined from the source vocabulary based on a corpus, a size of a candidate vocabulary in the group of candidate vocabularies being different from a size of the source vocabulary. A group of marginal scores are obtained for the group of candidate vocabularies, respectively, a marginal score in the group of marginal scores being obtained for the candidate vocabulary based on a corpus entropy of the candidate vocabulary and a size of the candidate vocabulary. The destination vocabulary is selected from the group of candidate vocabularies based on the group of marginal scores.

In a second aspect of the present disclosure, there is provided an electronic device. The electronic device comprises: a computer processor coupled to a computer-readable memory unit, the memory unit comprising instructions that when executed by the computer processor implements a method according to the first aspect of the present disclosure.

In a third aspect of the present disclosure, there is provided a computer program product, the computer program product comprising a computer readable storage medium having program instructions embodied therewith, the program instructions executable by an electronic device to cause the electronic device to perform a method according to the first aspect of the present disclosure.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE SEVERAL VIEWS OF THE DRAWINGS

Through the more detailed description of some implementations of the present disclosure in the accompanying drawings, the above and other objects, features and advantages of the present disclosure will become more apparent, wherein the same reference generally refers to the same components in the implementations of the present disclosure.

DETAILED DESCRIPTION

Figure 1:
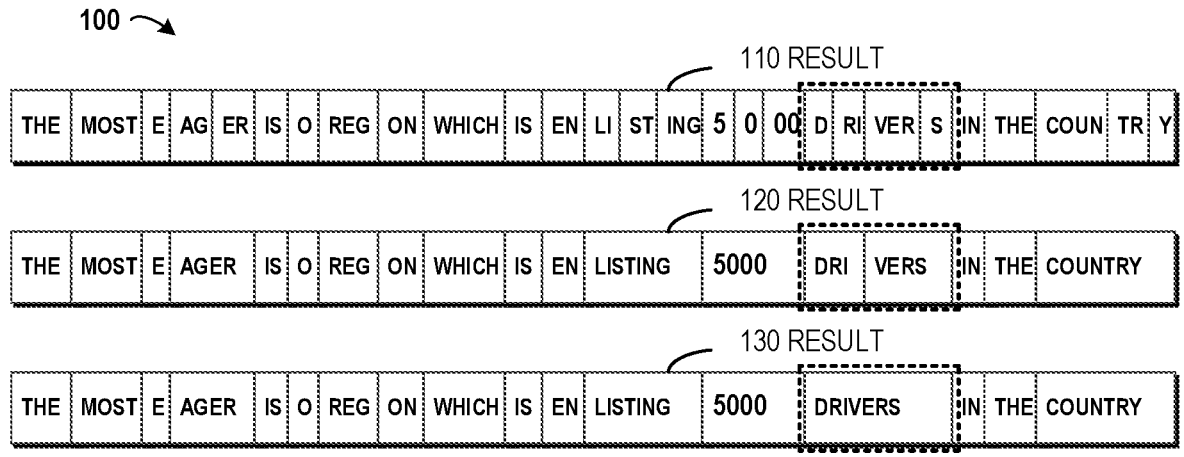
FIG. 1 depicts an example diagram for identifying a sentence with different vocabularies.

Principle of the present disclosure will now be described with reference to some implementations. It is to be understood that these implementations are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one implementation," "an implementation," "an example implementation," and the like indicate that the implementation described may include a particular feature, structure, or characteristic, but it is not necessary that every implementation includes the particular feature, structure, or characteristic. Moreover, such phrases are not necessarily referring to the same implementation. Further, when a particular feature, structure, or characteristic is described in connection with an example implementation, it is submitted that it is within the knowledge of one skilled in the art to affect such feature, structure, or characteristic in connection with other implementations whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example implementations. As used herein, the term "and/or" includes any and all combinations of one or more of the listed terms.

The terminology used herein is for the purpose of describing particular implementations only and is not intended to be limiting of example implementations. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

Principle of the present disclosure will now be described with reference to some implementations. It is to be understood that these implementations are described only for the purpose of illustration and help those skilled in the art to understand and implement the present disclosure, without suggesting any limitation as to the scope of the disclosure. The disclosure described herein can be implemented in various manners other than the ones described below. In the following description and claims, unless defined otherwise, all technical and scientific terms used herein have the same meaning as commonly understood by one of ordinary skills in the art to which this disclosure belongs.

In the neural machine translation, due to the discreteness of text, vocabulary construction (vocabularization for short) is a prerequisite for neural machine translation and many other natural language processing tasks using neural networks. Currently, sub-word approaches like Byte-Pair Encoding (BPE) are widely used in the community, and achieve quite promising results in practice. The general idea of BPE is to merge pairs of frequent character sequences to create sub-word units. Sub-word vocabularies can be regarded as a trade-off between character-level vocabularies and word-level vocabularies. Compared to word-level vocabularies, it can decrease the sparsity of tokens and increase the shared features between similar words, which probably have similar semantic meanings, like "happy" and "happier." Compared to character-level vocabularies, it has shorter sentence lengths without rare words.

In BPE, the most frequent sub-words (or word pieces with higher probabilities) are selected as the vocabulary tokens. In information theory, these frequency-based approaches are simple forms of data compression to reduce entropy which makes the resulting corpus easy to learn and predict. Reference will be made to FIG. 1 for a brief description of the vocabulary, here FIG. 1 depicts an example diagram 100 for identifying a sentence based on vocabularies with different sizes. In FIG. 1, a sentence includes the following content: "the most eager is Oregon which is enlisting 5000 drivers in the country." Here, all the characters may be identified from the sentence and then these characters may be mapped into sub-words based on a predefined vocabulary.

FIG. 1 shows three identification results based on three vocabularies with different sizes, where a result 110 is obtained based on a BPE vocabulary with 1K tokens (BPE-1K), a result 120 is obtained based on a BPE vocabulary with 10K tokens (BPE-10K), and a result 130 is obtained based on a BPE vocabulary with 30K tokens (BPE-30K). In FIG. 1, each block in the results 110, 120 and 130 represents a sub-word identified based on a token in the corresponding vocabulary. Taking the word "driver" in the text as an example, the word is mapped into four sub-words "d," "ri," "ver," and "s" based on the BPE vocabulary with 1 k tokens. However, the word is mapped into two sub-words "dri" and "vers" based on the BPE vocabulary with 10 k tokens, and is mapped into only one sub-word "drivers" based on the BPE vocabulary with 30 k tokens.

From FIG. 1, a larger vocabulary size may help to extract the semantic information from the text, however, a large size also leads to token sparsity and then decreases machine learning performance. Several solutions are provided to generate a vocabulary, however, these solutions take the frequency (or entropy) as the main criteria for judging the vocabulary, but fail to consider effects of vocabulary size sufficiently. Although some previous studies show that vocabulary size also affects downstream performances, especially on low-resource tasks, the previous studies fail to provide an effective way for judging the vocabulary based on the vocabulary size. Due to the lack of appropriate inductive bias about size, trial training (namely traversing all possible sizes) is usually required to search for the optimal size, which takes high computation costs.

In view of the above, the present disclosure proposes a vocabulary generation solution by simultaneously considering the corpus entropy and the vocabulary size without expensive trial training. In the proposed solution, both of the corpus entropy and the vocabulary size are considered. Generally, the corpus entropy (such as the entropy normalized by the average length of tokens) decreases with the increase of vocabulary size, which benefits model learning. While too many tokens cause token sparsity, it hurts model learning.

According to implementation of the present disclosure, a balance may be achieved between the corpus entropy and the vocabulary size based on a VOcabulary Learning approach via optimal Transport (VOLT for short). It may output an appropriate vocabulary in polynomial time by considering corpus entropy and vocabulary size. Specifically, given the above insight of contradiction between the entropy and size, the concept of marginal utility in economics is adopted in the disclosure for providing a marginal score as the measurement. In economics, marginal utility is used to balance the benefit and the cost. In the present disclosure the marginal score is to balance the corpus entropy (corresponding to the benefit) and vocabulary size (corresponding to the cost). A higher marginal score is expected for Pareto optimality. Formally, the marginal score may be defined as the negative derivative of entropy to vocabulary size.

Figure 2:
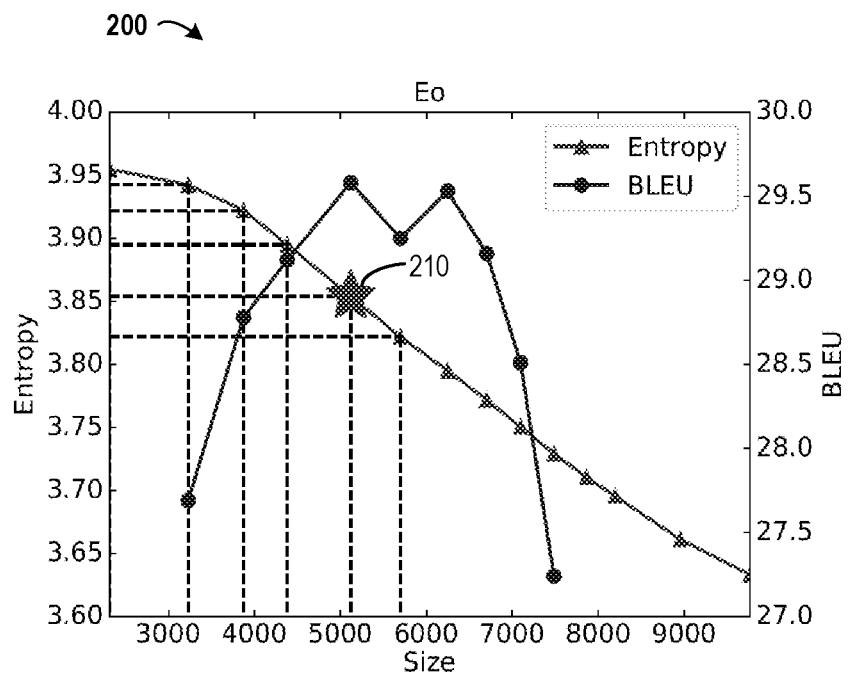
FIG. 2 depicts an example relationship between an corpus entropy and a size of a vocabulary according to implementations of the present disclosure.

FIG. 2 depicts an example relationship 200 between a corpus entropy and a size of a vocabulary according to implementations of the present disclosure. In FIG. 2, a horizontal axis represents a size of the vocabulary and a vertical axis represents the corpus entropy of the vocabulary. Here, BPE-generated vocabularies with different sizes are sampled from Eo-En translation and corresponding entropy and BLEU lines. The "Star" 210 represents the vocabulary with the maximum marginal utility. The marginal utility evaluates the increase of benefit (entropy decrease) from an increase of cost (size).

Based on FIG. 2, the goal for finding an optimal vocabulary turns to a problem for maximizing marginal score in tractable time complexity. Here, the discrete optimization objective is reformulated into an optimal transport problem that may be solved in polynomial time by linear programming. The vocabularization procedure may be regarded as finding the optimal transport matrix from the character distribution to the vocabulary token distribution. Based on the above, the VOLT solution is provided for yielding a vocabulary from the optimal transport matrix and a source vocabulary.

Figure 3:
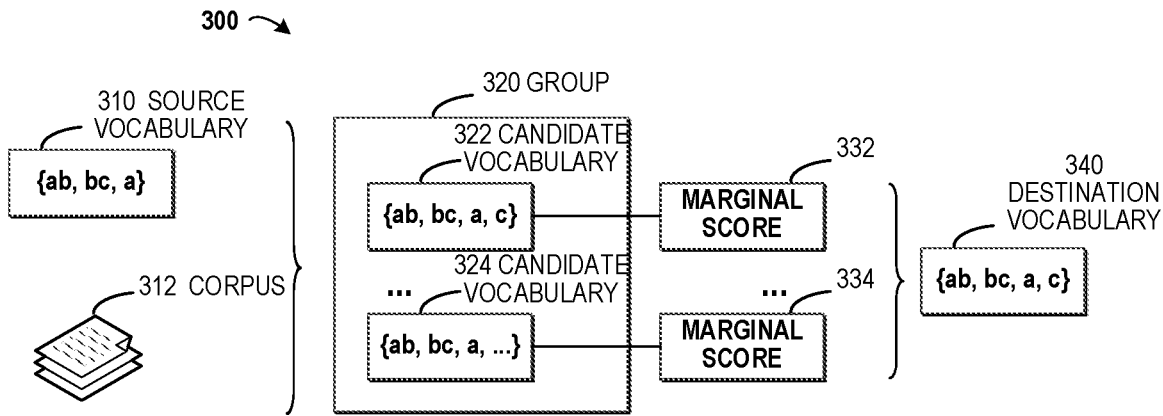
FIG. 3 depicts an example diagram for generating a destination vocabulary from a source vocabulary according to implementations of the present disclosure.

Hereinafter, reference will be made to FIG. 3 for a brief of the present disclosure. FIG. 3 depicts an example diagram 300 for generating a destination vocabulary from a source vocabulary according to implementations of the present disclosure. In FIG. 3, a source vocabulary 310 and a corpus 312 are received for generating a destination vocabulary 340. The corpus 312 may work as a training corpus and include multiple texts written in any language such as English, French, Russian, Chinese, Japanese, and the like. In addition to and/or alternatively, the texts may involve multiple languages, such as a combination of two or more languages. In the present disclosure, the English language is taken an example for description, and here the corpus 312 may include texts with words consist of the 26 English letters.

Further, a group 320 of candidate vocabularies 322, ..., 324 may be obtained from the source vocabulary 310 based on the corpus 312. Here, the size of each candidate vocabulary in the group 320 may be different from the size of the source vocabulary 310, and then the size relationship between the candidate vocabulary and the source vocabulary 310 includes two situations: (1) the size of the candidate vocabulary is greater than that of the source vocabulary 310; and (2) the size of the candidate vocabulary is smaller than that of the source vocabulary 310.

In the first situation, each candidate vocabulary may include more tokens than the source vocabulary 310. In other words, the source vocabulary 310 is extended and sizes of the candidate vocabularies 322, ..., 324 are greater than the size of the source vocabulary 310. For example, the source vocabulary 310 may include tokens such as "ab," "bc," and "a." The candidate vocabulary 322 may further include a token "c," and the candidate vocabulary 324 may further include other tokens. Then, a group of marginal scores 332, ..., and 334 may be determined for the group 320 of candidate vocabularies 322, ..., and 324, respectively. In the first situation, each candidate vocabulary may include fewer tokens than the source vocabulary 310. In other words, some tokens are removed from the source vocabulary 310 in determining the group of candidate vocabularies.

Here, a marginal score is obtained for a corresponding candidate vocabulary based on the corpus entropy of the candidate vocabulary and a size of the candidate vocabulary. For example, a marginal score 332 is determined for the candidate vocabulary 322, ..., and a marginal score 334 is determined for the candidate vocabulary 324. Further, the destination vocabulary 340 may be obtained from the group 320 of candidate vocabularies 322, ..., and 324 based on the group of marginal scores. With these implementations, the marginal score may reflect the performance of the vocabulary based on both of the corpus entropy and the size. Therefore, the destination vocabulary may be determined in a more effective and easy way.

The following paragraphs will provide more details about the marginal score. According to implementations of the present disclosure, the marginal score may be represented by the negative derivation of entropy to size for a vocabulary. Specially, the marginal score may be determined as:

$$\mathcal{M}_{v(k+m)} = \frac{-(\mathcal{H}_{v(k+m)} - \mathcal{H}_{v(k)})}{m} \quad \text{Formula 1}$$

where v(k) represents a vocabulary with k tokens, and v(k+m) represents a vocabulary with k+m tokens. $\mathcal{H}$ v represents the corpus entropy for the vocabulary v, which is defined by the normalized sum of token entropy.

According to implementations of the present disclosure, the corpus entropy may be normalized with the average length of tokens so as to avoid the effects of token length. Specifically, the frequency for tokens in the candidate vocabulary occurring in the corpus may be determined, and then the corpus entropy may be determined based on the frequency and the average length of tokens in the candidate vocabulary. Here, the final corpus entropy may be defined as:

$$\mathcal{H}_v = -\frac{1}{l_v} \sum_{i \in v} P(i) \log P(i) \quad \text{Formula 2}$$

where P(i) represents the frequency for token i from the training corpus, and $l_v$ represents the average length of tokens in vocabulary v.

According to implementations of the present disclosure, there are two ways to get the group 320 of candidate vocabularies 322, ..., and 324: search and learning. In the search-based direction, the marginal score may be combined with widely-used vocabularization solutions. For example, the optimal vocabularies may be obtained by enumerating all candidate vocabularies generated by BPE. While being simple and effective, it is not a self-sufficient approach. Furthermore, it still requires a lot of time to generate vocabularies and calculate the marginal score. In order to address these problems, the present disclosure provides a learning-based solution VOLT for more vocabulary possibilities.

In the context of the present disclosure, the vocabulary construction is formulated as a discrete optimization problem whose target is to find the vocabulary with the highest marginal score according to Formula 1. However, the vocabulary is discrete and such discrete search space is too large to traverse, which makes the discrete optimization intractable. According to implementations of the present disclosure, the original discrete optimization problem is simplified by searching for the optimal vocabulary from vocabularies with fixed sizes. Therefore, the group of candidate vocabularies may be obtained during several rounds. In other words, a portion of the candidate vocabularies may be obtained in each round, and the portion of the candidate vocabularies obtained in a certain round may have a fixed size. For example, a step length may be defined and a vocabulary size for a next round may be increased by the step length.

As described in the previous paragraphs, the size relationship between the candidate vocabulary and the source vocabulary includes two situations, and then there may be two directions for determining the group of candidate vocabularies. For example, a small source vocabulary (such as a BPE-1K vocabulary and the like) may be predefined initially, and then the small source vocabulary may be extended by adding one or more characters into tokens included in the small source vocabulary, so as to obtain candidates vocabularies with greater sizes. In another example, a large source vocabulary (such as a BPE-200K vocabulary and the like) may be predefined initially, and then the large source vocabulary may be filtered by removing some tokens, so as to obtain candidates vocabularies with smaller sizes. Hereinafter, the following paragraphs will describe the first situation first, where the small source vocabulary may be gradually extended into the larger candidate vocabularies.

Figure 4:
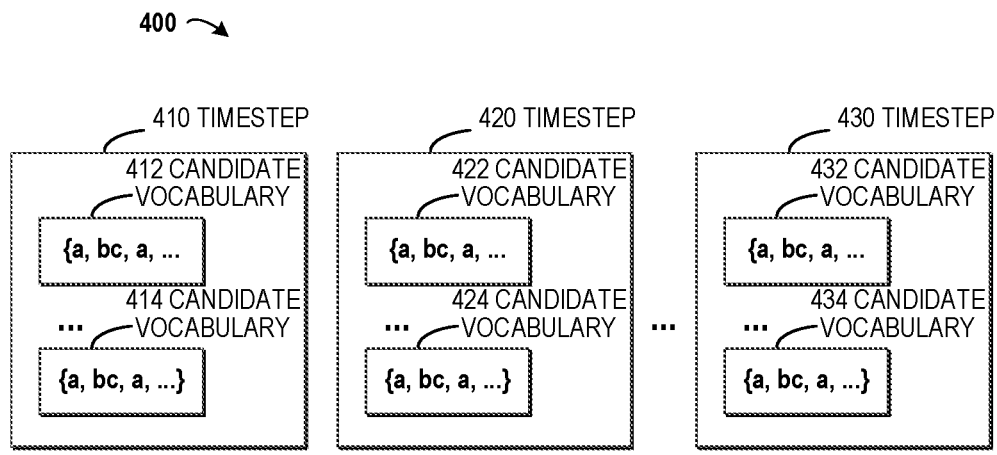
FIG. 4 depicts an example diagram for obtaining a group of candidate vocabularies in multiple timesteps according to implementations of the present disclosure.

Based on the above, a plurality of timesteps may be determined based on the predefined step length and a size of the source vocabulary, and each timestep corresponds to a round for obtaining a portion of the candidate vocabularies. Reference will be made to FIG. 4 for more details for obtaining the group of candidate vocabularies, where FIG. 4 depicts an example diagram 400 for obtaining a group of candidate vocabularies in multiple timesteps according to implementations of the present disclosure. Here, an auxiliary variable S (S is an incremental integer sequence) is introduced to approximate the computation by only computing marginal score between vocabulary sizes as adjacent integers in S. Formally, $S=\{i, 2 \cdot i, \ldots, (t-1) \cdot i, \ldots \}$, where each timestep t corresponds a set of vocabularies with the number up to S[t], and i represents the predetermined step length for the incremental integer sequence.

As shown in FIG. 4, a timestep 410 may correspond to the first value in the incremental integer sequence, a timestep 420 may correspond to the second value in the incremental integer sequence, and a timestep 430 may correspond to the last value in the incremental integer sequence. Here, the size of the incremental integer sequence may be less than the size of candidate tokens ranked by the frequency. In each timestep, at least one candidate vocabulary may be determined, for example, the candidate vocabulary 412, . . . 414 may be determined in the timestep 410, and the candidate vocabulary 422, . . . 424 may be determined in the timestep 420, . . . , and the candidate vocabulary 432, . . . 434 may be determined in the timestep 430. After all the timesteps are finished, the group 320 of candidate vocabulary includes all the candidate vocabularies 412, 414, 422, 424, 432, 434, . . . that are determined in each timestep. With these implementations, the original discrete optimization problem is simplified by searching for the optimal vocabulary from vocabularies with fixed sizes, and thus the computing resource and time costs may be reduced.

Here, sizes of the candidate vocabularies determined in a same timestep are within a same range, and the range is greater than a range for the size of a candidate vocabulary determined in a previous timestep by the predetermined step length i. For example, as the first timestep, the size of the candidate vocabulary 412 is within a range of [size, size+i], where size represents the size of the source vocabulary 310, and size+i represents a sum of the size of the source vocabulary 310 and the predetermined step length i. For the second timestep, the size of the candidate vocabulary 422 is within a range of [size+i, size+2i].

Figures 5, 6:
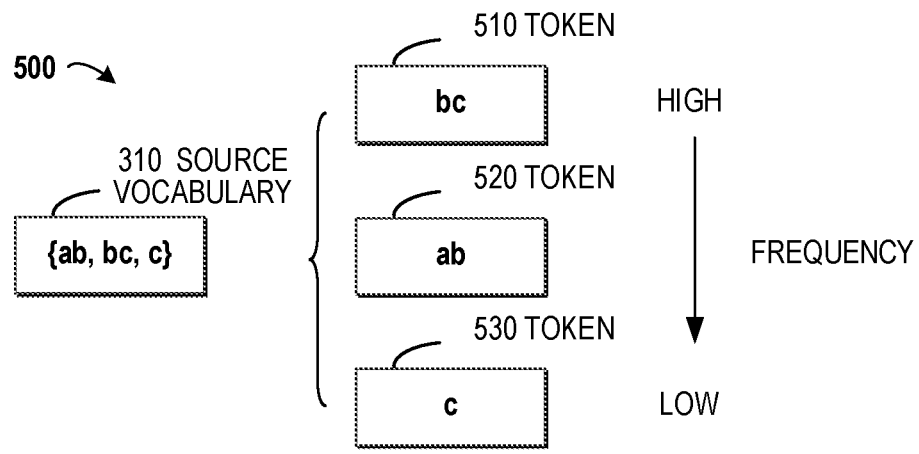
FIG. 5 depicts an example diagram for obtaining at least one candidate vocabulary in each timestep according to implementations of the present disclosure.
FIG. 6 depicts an example diagram for a transport matrix according to implementations of the present disclosure.

As the source vocabulary 310 may have hundreds of or even more tokens, considering all the tokens during obtaining the candidate vocabularies may lead to huge computing resource and time costs, therefore only frequently occurred tokens are considered in each timestep. Reference will be made to FIG. 5 for more details for determining the at least one candidate vocabulary in each timestep.

FIG. 5 depicts an example diagram 500 for obtaining at least one candidate vocabulary in each timestep according to implementations of the present disclosure. In the first timestep, tokens in the source vocabulary 310 may be ranked based on their occurrence frequency in the corpus 312. For example, if the token 510 "bc" has the highest frequency in the corpus 312, then the token 510 is ranked as the first one. Similarly, the tokens 520 and 530 may be ranked as the second one and third one according to their occurrence frequency. It is to be understood that the source vocabulary 310 including three tokens is only an example for illustration, a real source vocabulary may include hundreds of or thousands of tokens, and then a subset of tokens may be selected from the source vocabulary based on the frequency for tokens included in the source vocabulary occurring in the corpus, so as to reduce the computing resource and time costs for further processing. It is to be understood that, the above way for determining the subset based on the frequently occurred tokens are just an example, in another implementation, the subset may be determined in another way, for example, in a random way and the like.

Further, the subset of tokens may be processed in the corresponding timestep. Specifically, at least one candidate vocabulary may be obtained in each timestep by adding at least one character in the corpus into a token in the subset of tokens. With these implementations, the candidate vocabulary may be easily obtaining by extending a previous vocabulary with one or more characters added in the frequently used tokens. Therefore, the vocabulary size may be increased gradually.

According to implementations of the present disclosure, a character set may be obtained from the corpus 312. Here, the character set may include all characters in the corpus 312. In the situation of the corpus 312 is in the English language, the character set may include all the 26 English letters. In the situation of the corpus 312 is in Russian, the character set may include all the Russian letters. Reference will be made to FIG. 6 for more details about obtaining a candidate vocabulary from a previous vocabulary.

FIG. 6 depicts an example diagram 600 for a transport matrix according to implementations of the present disclosure. As shown in FIG. 6, a transport matrix 620 may be generated for determining the least one candidate vocabulary. The transport matrix 620 may include a first dimension (such as a column) and a second dimension (such as a row). Here, the column in the transport matrix 620 may correspond to the subset of tokens, and the row in the transport matrix 620 may correspond to characters in the character set 610. Further, an element at a position in the transport matrix 620 indicates a probability for a character corresponding to the position being transported to a token corresponding to the position.

Although FIG. 6 illustrates an example transport matrix where the column corresponds to the token and the row correspond to the character, in another implementation, the column and the row may be swapped and the column may correspond to the character and the row may correspond to the token. With these implementations, the transport matrix provides an effective way for obtaining a candidate vocabulary with more tokens inside. Meanwhile, the probabilities in the transport matrix also provide an accurate way for determining the marginal score.

In FIG. 6, the probability is indicated by a frequency of the character/token that occurs in the corpus 312. Supposing the corpus 312 includes only three characters "a," "b" and "c," then the character set 610 may include the above three characters, and the value followed by each character refers to a frequency of the character in the corpus 312. For example, the character "a" occurs 200 times in the corpus 312. The frequency "200" includes two situations: the character "a" appears as a single word, and the character "a" appears as a portion in a word.

Figure 7:
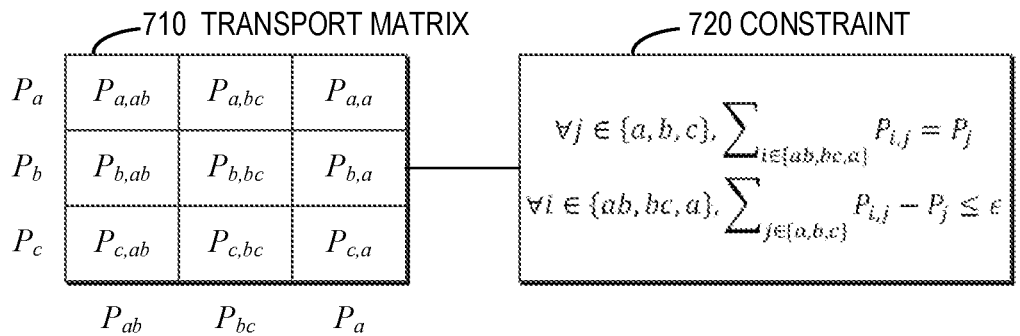
FIG. 7 depicts an example diagram for constraints of a transport matrix according to implementations of the present disclosure.

According to implementations of the present disclosure, constraints may be obtained for the transport matrix. For example, a sum of elements in the second dimension corresponds to a probability of the character occurred in the corpus. Specifically, in the first row corresponding to the character "a," a sum of all the elements in the first row "200 (160+0+0+0+0+0+40+0+0=200)" equals to the frequency of the character "a." Further, a sum of a difference between the element and a probability for a token in the subset of tokens being below a predefined threshold. Reference will be made to FIG. 7 for more details about the constraints.

FIG. 7 depicts an example diagram 700 for constraints of a transport matrix according to implementations of the present disclosure. In FIG. 7, a transport matrix 710 shows a transport matrix that is related to the source vocabulary 310. Here, the transport matrix 710 includes three rows (corresponding to the three characters "a," "b," and "c," respectively), and three columns (corresponding to the three tokens "ab," "bc," and "a," respectively). At this point, a probability for a position (i,j) in the transport matrix 710 may be represented by P(i,j).

In each timestep, as the number of characters is fixed and then the sum of each row in the transport matrix may be set to the probability of the character j. The upper bound of the character requirements for each token is fixed, and then the sum of each column in the transport matrix may be to the probability of token i. Formally, the constraints for the transform matrix are defined as:

$$\sum_i P(i, j) = P(j) \quad \text{Formula 3}$$

$$\left|\sum_j P(i, j) - P(i)\right| \le \epsilon \quad \text{Formula 4}$$

Where P D represents a probability for a position (i,j) in the transport matrix, i represent a token in the vocabulary, j represents a character in the character set, P(i) represents a probability for a token i, P(j) represents a probability for a character j, and E is small. With these implementations, the constraints should be considered in the optimal transport, which provides an accurate way for determining the marginal score.

Based on the above transport matrix 710 and the source vocabulary 310, a candidate vocabulary may be obtained in the first timestep. According to implementations of the present disclosure, the above procedure for obtaining the candidate vocabulary may be implemented repeatedly in each timestep, and then the group of candidate vocabulary may be obtained after all the timesteps are finished. Here, a candidate vocabulary that is obtained in a previous timestep may be called as a previous vocabulary, and then a candidate vocabulary may be obtained in the current timestep based on a corresponding transport matrix and a corresponding previous vocabulary. For example, the candidate vocabulary 422 in FIG. 4 may be obtained in the timestep 420 based on the previous candidate vocabulary 412 and a transport matrix.

According to implementations of the present disclosure, the candidate vocabulary may possibly include tokens that are not unlikely to be generated. In order to reduce potential resource and time costs by these tokens, a token that is associated with a low transport probability in the transport matrix may be removed from the candidate vocabulary. Specifically, a threshold may be predefined for the removing procedure, and if a frequency for a token is below the predefined threshold, the token may be removed. Specifically, elements in the transport matrix may be compared with the threshold to determine whether the associated token should be removed. For example, if P j) in the transport matrix is below the threshold, the associated token i may be removed. Therefore, performance of the candidate vocabulary may be increased by dropping the unfrequently used tokens.

According to implementations of the present disclosure, the concept of marginal utility is used to balance the benefit and the cost, and here the marginal score is to balance the entropy (benefit) and vocabulary size (cost). Higher marginal score is expected for Pareto optimality. Formally, the marginal score is defined as the negative derivative of entropy to vocabulary size. Therefore, with respect to the candidate vocabulary, a negative derivation may be determined as the marginal score based on the corpus entropy of the candidate vocabulary to the size of the candidate vocabulary. Specifically, an entropy difference may be determined between the corpus entropy and a previous corpus entropy of the previous vocabulary. Then, the negative derivation may be determined based on the entropy difference and the predefined step length.

According to implementations of the present disclosure, the marginal score may be determined according to the following formula. For any vocabulary, its marginal score may be calculated based on a vocabulary from its previous timestep. With sequence S, the target to find the optimal vocabulary v(t) (the vocabulary v at the timestep t) with the highest marginal score may be formulated as:

$$\operatorname*{argmax}_{v(t-1)\in \mathbb{V}_{S[t-1]}, v(t)\in \mathbb{V}_{S[t]}} \mathcal{M}_{v(t)} = \quad \text{Formula 5}$$

$$\operatorname*{argmax}_{v(t-1)\in \mathbb{V}_{S[t-1]}, v(t)\in \mathbb{V}_{S[t]}} -\frac{1}{i}[\mathcal{H}_{v(t)} - \mathcal{H}_{v(t-1)}]$$

where $\mathbb{V}_{S[t-1]}$ and $\mathbb{V}s[t]$ involve two sets containing all vocabularies with upper bound of size S[t−1] and S[t]. Due to exponential search space, it is almost impossible to find all the candidate vocabularies. In order to reduce the calculation costs, an extreme value may be found for the marginal scores. For example, its lower bound is optimized as:

$$\operatorname*{argmax}_{t} \frac{1}{i}\left[\max_{v(t)\in \mathbb{V}_{S[t]}} \mathcal{H}_{v(t)} - \max_{v(t-1)\in \mathbb{V}_{S[t-1]}} \mathcal{H}_{v(t-1)}\right] \quad \text{Formula 6}$$

where i represents the size difference between the vocabulary at the timestep t−1 and the vocabulary at the timestep t. The marginal score requires the size difference as a denominator. Based on this, the whole solution is divided into two steps: (1) searching for the optimal vocabulary with the highest corpus entropy at each timestep t; and (2) enumerating all the timesteps and then outputting the vocabulary corresponding to the timestep satisfying Formula 6.

The following paragraphs will describe details about searching for the vocabulary with the highest entropy from $\mathbb{V}_{S[t]}$. According to implementations of the present disclosure, in order to achieve the goal of step (1), in each timestep, an extreme candidate vocabulary that has an extreme corpus entropy among all the candidate vocabularies (obtained in the timestep) may be determined. Formally, the goal is to find a vocabulary v(t) such that corpus entropy is maximized, $$\underset{v(t)\in \mathbb{V}_{S[t]}}{\operatorname{argmax}} -\frac{1}{l_{v(t)}} \sum_{i\in v(t)} P(i)\log P(i) \qquad \text{Formula 7}$$

where $l_{v(t)}$ represents the average length for tokens in the vocabulary v(t), P(i) represents the probability of token i. However, this problem is in general intractable due to the extensive vocabulary size. Therefore, a relaxation in the formulation of discrete optimal transport is proposed, which may then be solved efficiently via the Sinkhorn algorithm. Intuitively, the vocabulary construction may be converted into a transport procedure that transports characters into token candidates with the number up to S[t]. In some implementations, the number of characters occurred in the corpus is fixed, and not all tokens may get enough characters. Each transport matrix may build a vocabulary by collecting tokens with characters. Different transport matrices bring different transport costs. Therefore, the target of optimal transport is to find a transport matrix to minimize the transfer cost, i.e., negative entropy described above.

The following paragraphs provide details about the vocabularization via optimal transport. Given a set of vocabularies $\mathbb{V}_{S[t]}$, the vocabulary with the highest entropy may be found. Consequently, the objective function in Formula 7 becomes:

$$\min_{v\in \mathbb{V}_{S[t]}} \frac{1}{l_v} \sum_{i\in v} P(i)\log P(i), \qquad \text{Formula 8}$$

$$\text{s.t. } P(i) = \frac{\text{Token}(i)}{\sum_{k\in v}\text{Token}(i)}, \quad l_v = \frac{\sum_{k\in v}\text{len}(i)}{|v|}$$

Token(i) represents the frequency of token i occurs in the vocabulary v. len(i) represents the length of token i. Here, both the distribution P(i) and the average length $l_v$ depend on the vocabulary v.

In order to obtain a tractable lower bound of the entropy, it suffices to give a tractable upper bound of the above objective function. According to implementations of the present disclosure, the merging rules is adopted to segment raw text similar with BPE, where two consecutive tokens in the candidate vocabulary may be merged into a merged token if the merged token is also in the candidate vocabulary. To this end, $\mathbb{T} \in \mathbb{V}_{S[t]}$ may represent the vocabulary containing top S[t] most frequent tokens, $\mathbb{C}$ may represent the character set and $|\mathbb{T}|$ and $|\mathbb{C}|$ may represent respective sizes of the vocabulary $\mathbb{T}$ and character set $\mathbb{C}$. Since $\mathbb{T}$ is an element of $\mathbb{V}_{S[t]}$, the following formula may be obtained:

$$\min_{v\in \mathbb{V}_{S[t]}} \frac{1}{l_v}\sum_{i\in v} P(i)\log P(i) \le \frac{1}{l_\mathbb{T}}\sum_{i\in \mathbb{T}} P(i)\log P(i) \qquad \text{Formula 9}$$

Here we start from the upper bound of the above objective function, that is $$\frac{1}{l_\mathbb{T}} \sum_{k\in \mathbb{T}} P(i)\log P(i),$$

and then search for a refined token set from $\mathbb{T}$. In this way, the search space is reduced into the subsets of $\mathbb{T}$. Let P(i,j) be the joint probability distribution of the tokens and chars that we want to learn, the following formula may be determined:

$$\sum_{i\in \mathbb{T}} P(i)\log P(i) = \sum_{i\in \mathbb{T}}\sum_{j\in \mathbb{C}} P(i,j)\log P(i) \qquad \text{Formula 10}$$

$$= \underbrace{\sum_{i\in \mathbb{T}}\sum_{j\in \mathbb{C}} P(i,j)\log P(i,j)}_{\mathcal{L}_1}$$

$$+ \underbrace{\sum_{i\in \mathbb{T}}\sum_{j\in \mathbb{C}} P(i,j)(-\log P(j\mid i))}_{\mathcal{L}_2}$$

Where $\mathcal{L}_i$ represents the negative entropy of the joint probability distribution P(i,j), it is denoted as —H(P). Therefore, —H(P) may be determined when the candidate vocabulary is known. Therefore, the value of $\mathcal{L}_1$ in Formula 10 may be determined, and the value of $\mathcal{L}_2$ in Formula 10 is still unknown by now.

According to implementations of the present disclosure, a distance matrix may be generated for describing a distance between the previous vocabulary and the current candidate vocabulary. Here, the distance matrix may correspond to the distance matrix, where a first dimension (such as the column) in the distance matrix may correspond to the subset of tokens a second dimension in the distance matrix may correspond to characters in the character set, and an element at a position in the distance matrix may indicate a distance for transporting a character corresponding to the position in the second dimension to a token corresponding to the position in the first dimension. With this distance matrix, a cost for distributing the characters to tokens in the candidate vocabulary may be determined.

Figure 8:
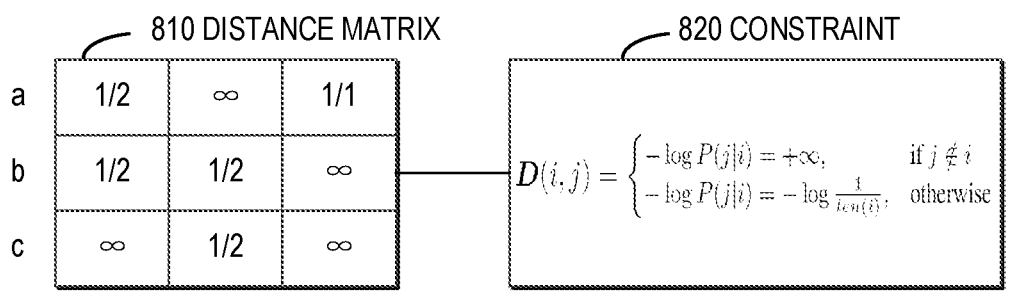
FIG. 8 depicts an example diagram for definitions of a distance matrix according to implementations of the present disclosure.

Reference will be made to FIG. 8 for more details about the distance matrix, where FIG. 8 depicts an example diagram 800 for constraints of a distance matrix according to implementations of the present disclosure. In FIG. 8, a distance matrix 810 ($|\mathbb{C}|\times|\mathbb{T}|$) may be generated. Similarly as the transport matrix 710, the distance matrix 810 also has three columns corresponding to the tokens and three rows corresponding to the characters. In the distance matrix 810, the element at the position (i,j) may be determined by −log (P(j/i) as calculated from the detailed formula in constraint 820. Here, P may represent the joint probability matrix, and then the following formula may be obtained:

$$\mathcal{L}_2 = \langle P, D \rangle = \sum_i \sum_j P(i,j) D(i,j) \qquad \text{Formula 11}$$

In this way, Formula 10 may be reformulated as the following objective function which has the same form as the objective function in optimal transport:

$$\min_{P\in \mathbb{R}^{m\times n}} \langle P, D\rangle - \gamma H(P) \qquad \text{Formula 12}$$

In order to implement the optimal transport, P may be regarded as the transport matrix from the perspective of optimal transport, and D may be regarded as the distance matrix. Here, the optimal transport aims at finding the best transporting way from the character distribution to the target token distribution (defined in the candidate vocabulary) with the minimum work defined by $\langle P, D \rangle$.

In order to verify the validness of transport solutions, the following constraints may be added into the transport procedure. First, to avoid invalid transport between the character j and the token i, the distance between the character j and the token i may be set to $+\infty$ if the target token i does not contain the character j. Otherwise, $$\frac{1}{\text{len}(i)}$$

is used to estimate P(j|i), where len(i) represents the length of token i. Formally, the distance matrix is defined as Formula 13, and each element D(i,j) in the distance matrix 810 may be determined.

$$D(i, j) = \begin{cases} -\log P(j \mid i) = +\infty, & \text{if } j \notin i \\ -\log P(j \mid i) = -\log \frac{1}{\text{len}(i)}, & \text{otherwise} \end{cases} \quad \text{Formula 13}$$

Figure 9:
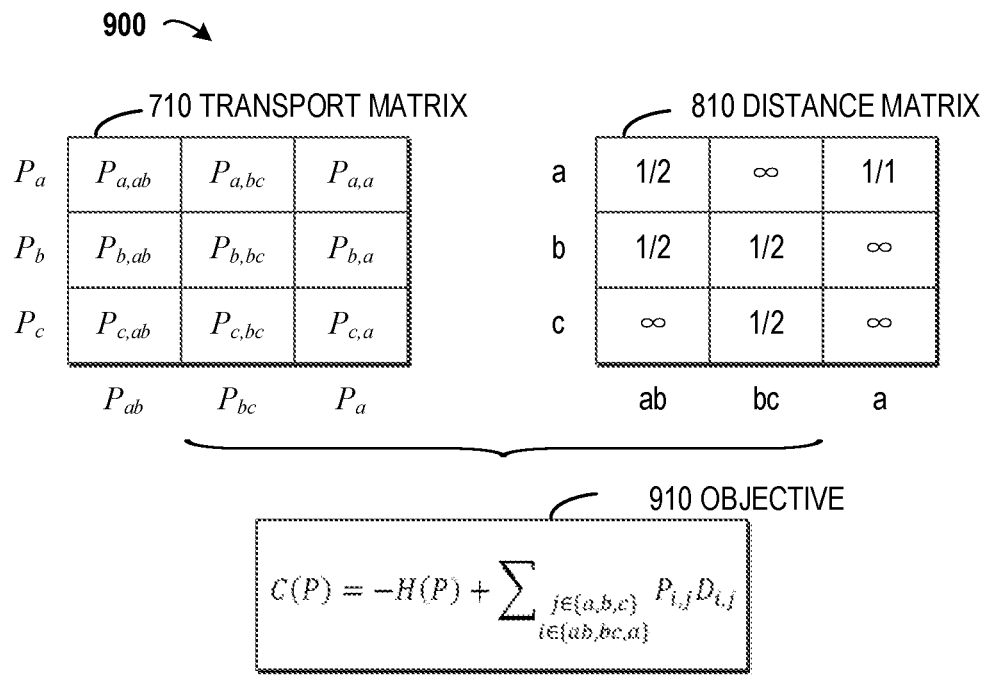
FIG. 9 depicts an example diagram for an objective function according to implementations of the present disclosure.

With these implementations, the constraints should be considered in the optimal transport. Meanwhile, the distance in the distance matrix also provides an accurate cost estimation for determining the marginal score. Reference will be made to FIG. 9 for the details of optimal transport solution, here FIG. 9 depicts an example diagram 900 for an objective function according to implementations of the present disclosure. In FIG. 9, the final objective function 910 may be constructed as:

$$C(P) = -H(P) + \Sigma_{i,j} P_{i,j} D_{i,j} \quad \text{Formula 14}$$

Once the transport matrix 710 (represented by P) and the distance matrix 810 (represented by D) are determined, the objective function may be determined based on Formula 14, and then an extreme value for the final objective may be formulated as:

$$\underset{P \in \mathbb{R}^{|C| \times |T|}}{\text{argmin}} \; -H(P) + \langle P, D \rangle, \quad \text{Formula 15}$$
$$\text{s.t.} \; \sum_i P(i, j) = P(j), \left| \sum_j P(i, j) - P(i) \right| \leq \epsilon, \epsilon > 0$$

Symbols in Formula 15 have the same meaning as those in the previous formulas, and the last line in Formula 15 shows the constraints for the transport matrix as defined in Formulas 3 and 4. Strictly speaking, this is an unbalanced entropy regularized optimal transport problem. Here, the generalized Sinkhorn algorithm may be used for finding the target vocabulary. The algorithm details are shown in Algorithm 1. At each timestep t, a new candidate vocabulary associated with entropy scores based on the transport matrix P. Finally, all these vocabularies associated with entropy scores may be collected to find a destination vocabulary satisfying Formula 6.

Based on the above Formula 15, an extreme candidate vocabulary that has the highest corpus entropy may be determined for the timestep. According to implementations of the present disclosure, the above solutions may be implemented in each timestep, and thus multiple extreme candidate vocabularies may be determined from all the timesteps.

The above paragraphs have described how to implement the step (1) for determining the optimal vocabulary with the highest corpus entropy at each timestep. Moreover, the following paragraphs will provide more details about the step (2). The step (2) aims at finding a vocabulary that satisfies Formula 6 from the extreme candidate vocabularies as determined in the step (1), therefore, all the extreme candidate vocabulary may be put into Formula 6. Specifically, with respect to each timestep t, a difference may be determined between the corpus entropy $\mathcal{H}_{v(t)}$ of the extreme candidate vocabulary for the timestep t and the corpus entropy $\mathcal{H}_{v(t-1)}$ of a previous extreme candidate vocabulary that is obtained in a previous timestep t−1. Therefore, multiple differences may be determined for all the timesteps, and then an extreme candidate vocabulary corresponding to the maximum difference in the multiple differences may be selected as the destination vocabulary.

Although the above paragraphs describe the vocabulary generation solution by taking the English language as an example, the above solution may be implemented for generation vocabularies (written in any language or a combination of multiple languages) with certain characters such as Chinese, Japanese and the like. Taking the Chinese language as an example, the character in the above implementations may refer to Chinese characters (also called as "hanzi") and the token may refer to Chinese phase consists of two or more Chinese characters. Further, in the Japanese language, the character may refer to Japanese characters (also called as "kanji") and the token may refer to Japanese phase consists of two or more Japanese characters.

The above paragraphs have described the first situation for determining the group of candidate vocabularies based on the small source vocabulary. In addition to and/or alternatively, in the second situation, a large source vocabulary may be provided initially and then the size of the large source vocabulary may be decreased for determining the group of candidate vocabularies in each timestep. Here, the second situation relates to an inverse procedure of the first situation. Specifically, in each timestep, at least one candidate vocabularies may be determined based on the auxiliary variable S, and tokens associated with smaller transport probabilities may be removed from the previous candidate vocabularies. In the second situation, an extreme candidate vocabulary may be selected in each timestep based on Formula 15, and then the selected extreme candidate vocabularies may be compared for selecting the final destination vocabulary based on Formula 6. The implementations for the second situation are similar as those of the first station and details will be omitted hereinafter.

With implementations in the present disclosure, the goal for finding an optimal destination vocabulary may be divided into two steps. Therefore, the original discrete optimization problem is simplified by searching for the optimal vocabulary from vocabularies with fixed sizes. Accordingly, the almost impossible optimization problem may be solved in an easy and effective way. The above solution may be implemented in various ways, for example, the following VOLT algorithm may generate the destination vocabulary 340 from the source vocabulary 310.

---

Algorithm 1: VOLT

Input: A sequence of token candidates $\mathbb{L}$ ranked by
 frequencies, an incremental integer sequence S
 where the last item of S is less than $\mathbb{L}$, a character
 sequence $\mathbb{C}$, a training corpus $D_c$ -continued ---
Algorithm 1: VOLT
---

```
Parameters: u ∈ ℝ₊^|C|, v ∈ ℝ₊^|T|
vocabularies = [ ]
for item in S do
    | // Begin of Sinkhorn algorithm
    | Initialize u = ones( ) and y = ones( )
    | T = L [: item]
    | Calculate token frequencies P(T) based on D_c
    | Calculate char frequencies P(C) based on D_c
    | Calculate D
    | while not converge do
    |     | u = P(T)/Dv
    |     |_ v = P(C)/D^T u
    | optimal_matrix = u.reshape(-1, 1) * D *
    |     v.reshape(1, -1)
    | // End of Sinkhorn algorithm
    | entropy, vocab = get_vocab(optimal_matrix)
    |_ vocabularies.append(entropy,vocab)
Output v* from vocabularies satisfying Formula 6
```

In the VOLT algorithm, tokens in the source vocabulary 310 are ranked by the occurrence frequencies to obtaining a sequence of token candidates $\mathbb{L}$. Further, an incremental integer sequence S is defined, where the last item of S is less than $|\mathbb{L}|$. Here, $\mathbb{C}$ represents a character sequence and $D_c$ represents the training corpus 312. According to the VOLT algorithm, for each item in S, an extreme candidate vocabulary may be determined for each timestep. Then, based on all the extreme candidate vocabularies determined in all the timesteps, the destination vocabulary that satisfying Formula 6 may be outputted. It is to be understood that the above VOLT algorithm is only an example algorithm for illustration, other algorithms may be implemented for implementing the above vocabulary generation solution.

According to implementations of the present disclosure, for simplification, the BPE generated tokens (e.g. BPE-100K) may be used as the token candidates. It is important to note that any segmentation algorithms can be used to initialize token candidates. Experiments show that different initialization approaches result in similar results. In some implementations, the BPE-100K for bilingual translation and the BPE-300K for multilingual translation may be adopted. All token candidates with their probabilities are then used to initialize $\mathbb{L}$ in the VOLT algorithm.

The size of the incremental integer sequence S may be a hyper-parameter and set to (1K, . . . , 10K) for bilingual translation, (40K, . . . , 160K) for multilingual settings. It is to be understood that the above parameters are just examples and other parameters may be adopted. For example, (2K, 4K, . . . , 20K) may be set for the bilingual translation, and (50K, 60K, . . . , 200K) may be set for multilingual translation. At each timestep, the candidate vocabulary with the maximum entropy may be obtained based on the transport matrix. It is inevitable to handle illegal transport case due to relaxed constraints. Further, tokens with distributed characters less than 0.001 (or another value) token frequencies may be removed. Finally, all the timesteps may be enumerated and the vocabulary satisfying Formula 6 may be selected the final destination vocabulary.

After generating the vocabulary, VOLT may use a greedy strategy to encode text similar to BPE. To encode text, it first splits sentences into character level tokens. Then, two consecutive tokens may be merged into one token if the merged one is in the vocabulary. This process keeps running until no tokens can be merged. Out-of-vocabulary tokens may be split into smaller tokens. Therefore, all the characters in the text may be encoded.

Figure 10:
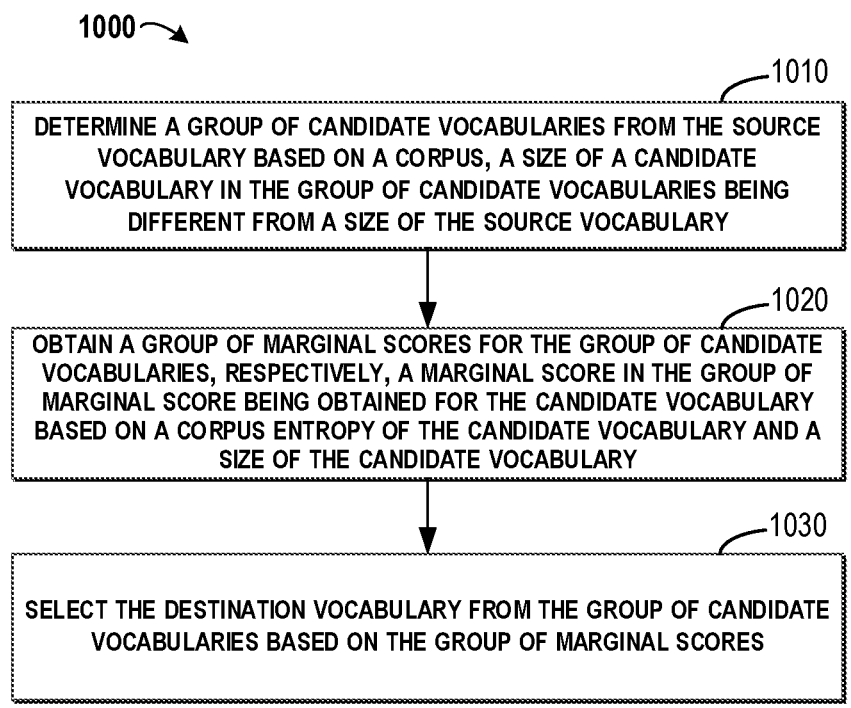
FIG. 10 depicts an example flowchart of a method for generating a destination vocabulary from a source vocabulary according to implementations of the present disclosure.

The above paragraphs have described details for the vocabulary generation solution. According to implementations of the present disclosure, a method is provided for generating a destination vocabulary from a source vocabulary. Reference will be made to FIG. 10 for more details about the method, where FIG. 10 depicts an example flowchart of a method 1000 for generating a destination vocabulary from a source vocabulary according to implementations of the present disclosure. At block 1010, a group of candidate vocabularies may be determined from the source vocabulary based on a corpus. Here, a size of a candidate vocabulary in the group of candidate vocabularies is different from a size of the source vocabulary.

According to implementations of the present disclosure, in order to determine the group of candidate vocabularies, a plurality of timesteps may be obtained for determining the group of candidate vocabularies based on a predefined step length and the size of the source vocabulary. At least one candidate vocabulary in the group of candidate vocabularies may be determined in a timestep of the plurality of timesteps. Here, a size of the at least one candidate vocabularies is different from the size of the source vocabulary by the predefined step length. In other words, the candidate vocabulary includes more (or fewer) tokens than the source vocabulary, and a difference between them is within the predefined step length.

According to implementations of the present disclosure, in order to determine the at least one candidate vocabulary in the timestep, a subset of tokens may be selected from the source vocabulary based on frequency for tokens included in the source vocabulary occurring in the corpus. Further, the at least one candidate vocabulary may be determined by adding, into a token in the subset of tokens, at least one character included in the corpus. Further, the at least one candidate vocabulary may be determined by removing, from the subset of tokens, at least one character included in the corpus.

According to implementations of the present disclosure, in order to obtain the at least one candidate vocabulary, a character set that includes all characters in the corpus may be obtained. A transport matrix may be generated for determining the least one candidate vocabulary. Here, a first dimension in the transport matrix corresponds to the subset of tokens and a second dimension in the transport matrix corresponds to characters in the character set, and an element at a position in the transport matrix indicates a probability for a character corresponding to the position being transported to a token corresponding to the position. Further, the at least one candidate vocabulary may be obtained based on the transport matrix and a previous vocabulary that is obtained in a previous timestep before the timestep.

According to implementations of the present disclosure, constrains for the transport matrix may comprise at least one of: a sum of elements in the second dimension corresponds to a probability of a character in the character set; and a sum of a difference between the element and a probability for a token in the subset of tokens being below a predefined threshold.

According to implementations of the present disclosure, in order to determine the group of candidate vocabularies, a token may be removed from the candidate vocabulary in response to an element in the transport matrix corresponding to the token being below a predefined threshold.

According to implementations of the present disclosure, in order to determine the corpus entropy of the candidate vocabulary, frequency for tokens in the candidate vocabulary occurring in the corpus may be obtained, an average length may be determined for tokens in the candidate vocabulary, and then the corpus entropy may be obtained based on the frequency and the average length.

At block 1020, a group of marginal scores may be obtained for the group of candidate vocabularies, respectively, a marginal score in the group of marginal scores being obtained for the candidate vocabulary based on a corpus entropy of the candidate vocabulary and a size of the candidate vocabulary.

According to implementations of the present disclosure, in order to obtain the group of marginal scores for the group of candidate vocabularies, with respect to the candidate vocabulary, a negative derivation of the corpus entropy to the size of the candidate vocabulary may be determined as the marginal score. Here, an entropy difference between the corpus entropy and a previous corpus entropy of the previous vocabulary may be determined, and the negative derivation may be determined based on the entropy difference and the predefined step length.

At block 1030, the destination vocabulary may be selected from the group of candidate vocabularies based on the group of marginal scores.

According to implementations of the present disclosure, in order to select the destination vocabulary, a plurality of extreme candidate vocabularies may be selected for the plurality of timesteps respectively, an extreme candidate vocabulary in the plurality of extreme candidate vocabularies having an extreme corpus entropy among the at least one candidate vocabulary that is obtained in the timestep. An extreme candidate vocabulary may be selected from the plurality of extreme candidate vocabularies, a difference between a corpus entropy of the selected extreme candidate vocabulary and a corpus entropy of a previous extreme candidate vocabulary that is obtained in a previous timestep having an extreme value. Further, the selected extreme candidate vocabulary may be identified as the destination vocabulary.

According to implementations of the present disclosure, in order to select the plurality of extreme candidate vocabularies, an extreme candidate vocabulary may be for the timestep. Specifically, a distance matrix corresponding to the transport matrix may be generated. Here, a first dimension in the distance matrix corresponds to the subset of tokens and a second dimension in the distance matrix corresponds to characters in the character set, and an element at a position in the distance matrix indicates a distance for transporting a character corresponding to the position to a token corresponding to the position. An extreme corpus entropy may be determined for the timestep based on the transport matrix and the distance matrix, and then a candidate vocabulary that has the extreme corpus entropy may be selected as the extreme candidate vocabulary for the timestep.

According to implementations of the present disclosure, an apparatus is provided for generating a destination vocabulary from a source vocabulary. The apparatus comprises: a determining unit, configured for determining a group of candidate vocabularies from the source vocabulary based on a corpus, a size of a candidate vocabulary in the group of candidate vocabularies being different from a size of the source vocabulary; an obtaining unit, configured for obtaining a group of marginal scores for the group of candidate vocabularies, respectively, a marginal score in the group of marginal scores being obtained for the candidate vocabulary based on a corpus entropy of the candidate vocabulary and a size of the candidate vocabulary; and a selecting unit, configured for selecting the destination vocabulary from the group of candidate vocabularies based on the group of marginal scores. Further, the apparatus may comprise other units for implementing other steps in the method 1000.

According to implementations of the present disclosure, an electronic device is provided for implementing the method 1000. The electronic device comprises: a computer processor coupled to a computer-readable memory unit, the memory unit comprising instructions that when executed by the computer processor implements a method for generating a destination vocabulary from a source vocabulary. The method comprises: determining a group of candidate vocabularies from the source vocabulary based on a corpus, a size of a candidate vocabulary in the group of candidate vocabularies being different from a size of the source vocabulary; obtaining a group of marginal scores for the group of candidate vocabularies, respectively, a marginal score in the group of marginal scores being obtained for the candidate vocabulary based on a corpus entropy of the candidate vocabulary and a size of the candidate vocabulary; and selecting the destination vocabulary from the group of candidate vocabularies based on the group of marginal scores.

According to implementations of the present disclosure, determining the group of candidate vocabularies comprises: obtaining a plurality of timesteps for determining the group of candidate vocabularies based on a predefined step length and the size of the source vocabulary; determining at least one candidate vocabulary in the group of candidate vocabularies in a timestep of the plurality of timesteps, a size of the at least one candidate vocabularies being different from the size of the source vocabulary by the predefined step length.

According to implementations of the present disclosure, determining the at least one candidate vocabulary in the timestep comprises: selecting a subset of tokens from the source vocabulary based on frequency for tokens included in the source vocabulary occurring in the corpus; and obtaining the at least one candidate vocabulary by any of: adding, into a token in the subset of tokens, at least one character included in the corpus; or removing, from the subset of tokens, at least one character included in the corpus.

According to implementations of the present disclosure, obtaining the at least one candidate vocabulary comprises: obtaining a character set that includes all characters in the corpus; generating a transport matrix for determining the least one candidate vocabulary, a first dimension in the transport matrix corresponding to the subset of tokens and a second dimension in the transport matrix corresponding to characters in the character set, and an element at a position in the transport matrix indicating a probability for a character corresponding to the position being transported to a token corresponding to the position; and obtaining the at least one candidate vocabulary based on the transport matrix and a previous vocabulary that is obtained in a previous timestep before the timestep.

According to implementations of the present disclosure, constrains for the transport matrix comprise at least one of: a sum of elements in the second dimension corresponds to a probability of a character in the character set; and a sum of a difference between the element and a probability for a token in the subset of tokens being below a predefined threshold.

According to implementations of the present disclosure, obtaining the group of marginal scores for the group of candidate vocabularies comprises: with respect to the candidate vocabulary, determining a negative derivation of the corpus entropy to the size of the candidate vocabulary as the marginal score by: determining an entropy difference between the corpus entropy and a previous corpus entropy of the previous vocabulary; and determining the negative derivation based on the entropy difference and the predefined step length.

According to implementations of the present disclosure, selecting the destination vocabulary comprises: selecting a plurality of extreme candidate vocabularies for the plurality of timesteps respectively, an extreme candidate vocabulary in the plurality of extreme candidate vocabularies having an extreme corpus entropy among the at least one candidate vocabulary that is obtained in the timestep; selecting an extreme candidate vocabulary from the plurality of extreme candidate vocabularies, a difference between a corpus entropy of the selected extreme candidate vocabulary and a corpus entropy of a previous extreme candidate vocabulary that is obtained in a previous timestep having an extreme value; and identifying the selected extreme candidate vocabulary as the destination vocabulary.

According to implementations of the present disclosure, selecting the plurality of extreme candidate vocabularies comprises: selecting an extreme candidate vocabulary for the timestep by, generating a distance matrix corresponding to the transport matrix, a first dimension in the distance matrix corresponding to the subset of tokens and a second dimension in the distance matrix corresponding to characters in the character set, and an element at a position in the distance matrix indicating a distance for transporting a character corresponding to the position to a token corresponding to the position; and determining an extreme corpus entropy for the timestep based on the transport matrix and the distance matrix; and selecting a candidate vocabulary that has the extreme corpus entropy as the extreme candidate vocabulary for the timestep.

According to implementations of the present disclosure, determining the group of candidate vocabularies further comprises: removing a token from the candidate vocabulary in response to an element in the transport matrix corresponding to the token being below a predefined threshold.

According to implementations of the present disclosure, the corpus entropy of the candidate vocabulary is determined by: obtaining frequency for tokens in the candidate vocabulary occurring in the corpus; determining an average length of tokens in the candidate vocabulary; and obtaining the corpus entropy based on the frequency and the average length.

According to implementations of the present disclosure, a computer program product, the computer program product comprising a computer readable storage medium having program instructions embodied therewith, the program instructions executable by an electronic device to cause the electronic device to perform the method 1000.

Figure 11:
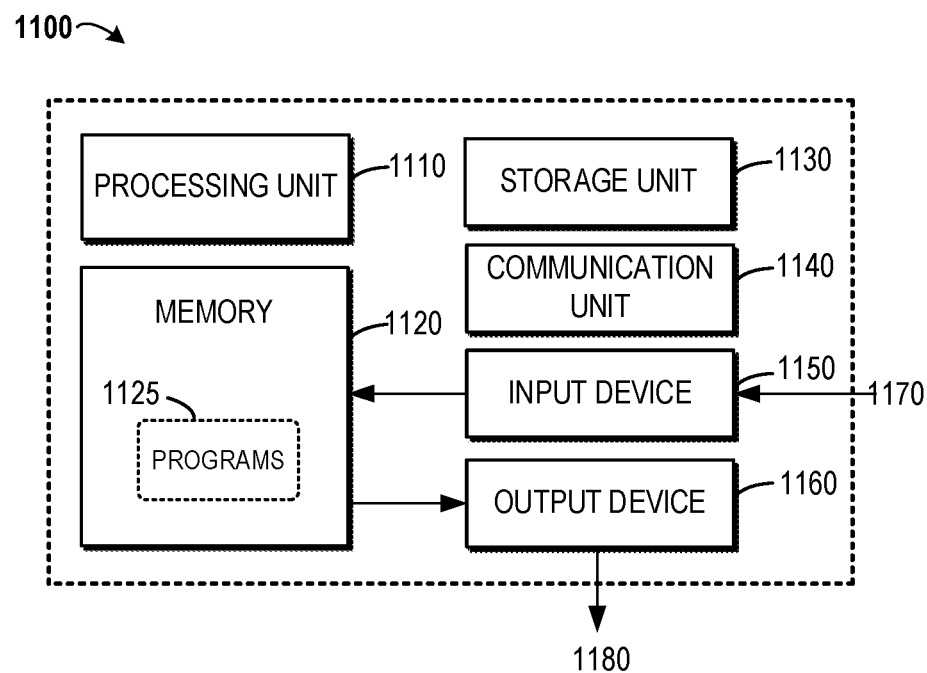
FIG. 11 illustrates a block diagram of a computing device in which various implementations of the present disclosure can be implemented.

FIG. 11 illustrates a block diagram of a computing device 1100 in which various implementations of the present disclosure can be implemented. It would be appreciated that the computing device 1100 shown in FIG. 11 is merely for purpose of illustration, without suggesting any limitation to the functions and scopes of the present disclosure in any manner. The computing device 1100 may be used to implement the above method 1000 in implementations of the present disclosure. As shown in FIG. 11, the computing device 1100 may be a general-purpose computing device. The computing device 1100 may at least comprise one or more processors or processing units 1110, a memory 1120, a storage unit 1130, one or more communication units 1140, one or more input devices 1150, and one or more output devices 1160.

The processing unit 1110 may be a physical or virtual processor and can implement various processes based on programs stored in the memory 1120. In a multi-processor system, multiple processing units execute computer executable instructions in parallel so as to improve the parallel processing capability of the computing device 1100. The processing unit 1110 may also be referred to as a central processing unit (CPU), a microprocessor, a controller or a microcontroller.

The computing device 1100 typically includes various computer storage medium. Such medium can be any medium accessible by the computing device 1100, including, but not limited to, volatile and non-volatile medium, or detachable and non-detachable medium. The memory 1120 can be a volatile memory (for example, a register, cache, Random Access Memory (RAM)), a non-volatile memory (such as a Read-Only Memory (ROM), Electrically Erasable Programmable Read-Only Memory (EEPROM), or a flash memory), or any combination thereof. The storage unit 1130 may be any detachable or non-detachable medium and may include a machine-readable medium such as a memory, flash memory drive, magnetic disk or another other media, which can be used for storing information and/or data and can be accessed in the computing device 1100.

The computing device 1100 may further include additional detachable/non-detachable, volatile/non-volatile memory medium. Although not shown in FIG. 11, it is possible to provide a magnetic disk drive for reading from and/or writing into a detachable and non-volatile magnetic disk and an optical disk drive for reading from and/or writing into a detachable non-volatile optical disk. In such cases, each drive may be connected to a bus (not shown) via one or more data medium interfaces.

The communication unit 1140 communicates with a further computing device via the communication medium. In addition, the functions of the components in the computing device 1100 can be implemented by a single computing cluster or multiple computing machines that can communicate via communication connections. Therefore, the computing device 1100 can operate in a networked environment using a logical connection with one or more other servers, networked personal computers (PCs) or further general network nodes.

The input device 1150 may be one or more of a variety of input devices, such as a mouse, keyboard, tracking ball, voice-input device, and the like. The output device 1160 may be one or more of a variety of output devices, such as a display, loudspeaker, printer, and the like. By means of the communication unit 1140, the computing device 1100 can further communicate with one or more external devices (not shown) such as the storage devices and display device, with one or more devices enabling the user to interact with the computing device 1100, or any devices (such as a network card, a modem and the like) enabling the computing device 1100 to communicate with one or more other computing devices, if required. Such communication can be performed via input/output (I/O) interfaces (not shown).

In some implementations, instead of being integrated in a single device, some or all components of the computing device 1100 may also be arranged in cloud computing architecture. In the cloud computing architecture, the components may be provided remotely and work together to implement the functionalities described in the present disclosure. In some implementations, cloud computing provides computing, software, data access and storage service, which will not require end users to be aware of the physical locations or configurations of the systems or hardware providing these services. In various implementations, the cloud computing provides the services via a wide area network (such as Internet) using suitable protocols. For example, a cloud computing provider provides applications over the wide area network, which can be accessed through a web browser or any other computing components. The software or components of the cloud computing architecture and corresponding data may be stored on a server at a remote position. The computing resources in the cloud computing environment may be merged or distributed at locations in a remote data center. Cloud computing infrastructures may provide the services through a shared data center, though they behave as a single access point for the users. Therefore, the cloud computing architectures may be used to provide the components and functionalities described herein from a service provider at a remote location. Alternatively, they may be provided from a conventional server or installed directly or otherwise on a client device.

The functionalities described herein can be performed, at least in part, by one or more hardware logic components. For example, and without limitation, illustrative types of hardware logic components that can be used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Program code for carrying out the methods of the subject matter described herein may be written in any combination of one or more programming languages. The program code may be provided to a processor or controller of a general-purpose computer, special purpose computer, or other programmable data processing apparatus such that the program code, when executed by the processor or controller, causes the functions/operations specified in the flowcharts and/or block diagrams to be implemented. The program code may be executed entirely or partly on a machine, executed as a stand-alone software package partly on the machine, partly on a remote machine, or entirely on the remote machine or server.

In the context of this disclosure, a machine-readable medium may be any tangible medium that may contain or store a program for use by or in connection with an instruction execution system, apparatus, or device. The machine-readable medium may be a machine-readable signal medium or a machine-readable storage medium. A machine-readable medium may include but not limited to an electronic, magnetic, optical, electromagnetic, infrared, or semiconductor system, apparatus, or device, or any suitable combination of the foregoing. More specific examples of the machine-readable storage medium would include an electrical connection having one or more wires, a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations are performed in the particular order shown or in sequential order, or that all illustrated operations are performed to achieve the desired results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular implementations. Certain features that are described in the context of separate implementations may also be implemented in combination in a single implementation. Rather, various features described in a single implementation may also be implemented in multiple implementations separately or in any suitable sub-combination.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

From the foregoing, it will be appreciated that specific implementations of the presently disclosed technology have been described herein for purposes of illustration, but that various modifications may be made without deviating from the scope of the disclosure. Accordingly, the presently disclosed technology is not limited except as by the appended claims.

Implementations of the subject matter and the functional operations described in the present disclosure can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. As used herein, the use of "or" is intended to include "and/or", unless the context clearly indicates otherwise.

While the present disclosure contains many specifics, these should not be construed as limitations on the scope of any disclosure or of what may be claimed, but rather as descriptions of features that may be specific to particular implementations of particular disclosures. Certain features that are described in the present disclosure in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the implementations described in the present disclosure should not be understood as requiring such separation in all implementations. Only a few implementations and examples are described and other implementations, enhancements and variations can be made based on what is described and illustrated in the present disclosure.

What is claimed is:

1. A method for generating a destination vocabulary by a machine learning model, comprising:
   inputting a sequence of token candidates and data indicative of a training corpus into the machine learning model, the sequence of token candidates generated based on a source vocabulary, and the training corpus comprising texts in at least one language;
   generating a group of candidate vocabularies at a plurality of timesteps by the machine learning model, the machine learning model is configured to generate optimal vocabularies with a computational efficiency by balancing a corpus entropy and a vocabulary size, wherein a size of a candidate vocabulary in the group of candidate vocabularies is different from a size of the source vocabulary;
   computing a group of marginal scores corresponding to the group of candidate vocabularies, respectively, wherein a marginal score in the group of marginal scores corresponding to a candidate vocabulary in the group of candidate vocabularies is computed based on a corpus entropy of the candidate vocabulary and a size of the candidate vocabulary, wherein computing the marginal score comprises computing a negative derivation of the corpus entropy to the size of the candidate vocabulary, and wherein the computing a negative derivation of the corpus entropy to the size of the candidate vocabulary further comprises:
   computing an entropy difference between the corpus entropy and a previous corpus entropy of a previous vocabulary, and
   computing the negative derivation based on the entropy difference and a predefined step length; and
   selecting the destination vocabulary from the group of candidate vocabularies based on the group of marginal scores.

2. The method of claim 1, wherein generating the group of candidate vocabularies comprises:
   obtaining a plurality of timesteps for determining the group of candidate vocabularies based on a predefined step length and the size of the source vocabulary;
   determining at least one candidate vocabulary in the group of candidate vocabularies in a timestep of the plurality of timesteps, a size of the at least one candidate vocabularies being different from the size of the source vocabulary by the predefined step length.

3. The method of claim 2, wherein determining the at least one candidate vocabulary in the timestep comprises:
   selecting a subset of tokens from the source vocabulary based on frequency for tokens included in the source vocabulary occurring in the corpus; and
   obtaining the at least one candidate vocabulary by any of:
   adding, into a token in the subset of tokens, at least one character included in the corpus; or
   removing, from the subset of tokens, at least one character included in the corpus.

4. The method of claim 3, wherein obtaining the at least one candidate vocabulary comprises:
   obtaining a character set that includes all characters in the corpus;
   generating a transport matrix for determining the least one candidate vocabulary, a first dimension in the transport matrix corresponding to the subset of tokens and a second dimension in the transport matrix corresponding to characters in the character set, and an element at a position in the transport matrix indicating a probability for a character corresponding to the position being transported to a token corresponding to the position; and
   obtaining the at least one candidate vocabulary based on the transport matrix and a previous vocabulary that is obtained in a previous timestep before the timestep.

5. The method of claim 4, wherein constrains for the transport matrix comprise at least one of:
   a sum of elements in the second dimension corresponds to a probability of a character in the character set; and
   a sum of a difference between the element and a probability for a token in the subset of tokens being below a predefined threshold.

6. The method of claim 4, wherein determining the group of candidate vocabularies further comprises: removing a token from the candidate vocabulary in response to an element in the transport matrix corresponding to the token being below a predefined threshold.

7. The method of claim 1, wherein selecting the destination vocabulary comprises:
selecting a plurality of extreme candidate vocabularies for the plurality of timesteps respectively, an extreme candidate vocabulary in the plurality of extreme candidate vocabularies having an extreme corpus entropy among the at least one candidate vocabulary that is obtained in the timestep;
selecting an extreme candidate vocabulary from the plurality of extreme candidate vocabularies, a difference between a corpus entropy of the selected extreme candidate vocabulary and a corpus entropy of a previous extreme candidate vocabulary that is obtained in a previous timestep having an extreme value; and
identifying the selected extreme candidate vocabulary as the destination vocabulary.

8. The method of claim 7, wherein selecting the plurality of extreme candidate vocabularies comprises: selecting an extreme candidate vocabulary for the timestep by,
generating a distance matrix corresponding to the transport matrix, a first dimension in the distance matrix corresponding to the subset of tokens and a second dimension in the distance matrix corresponding to characters in the character set, and an element at a position in the distance matrix indicating a distance for transporting a character corresponding to the position to a token corresponding to the position; and
determining an extreme corpus entropy for the timestep based on the transport matrix and the distance matrix; and
selecting a candidate vocabulary that has the extreme corpus entropy as the extreme candidate vocabulary for the timestep.

9. The method of claim 1, wherein the corpus entropy of the candidate vocabulary is determined by:
obtaining frequency for tokens in the candidate vocabulary occurring in the corpus;
determining an average length of tokens in the candidate vocabulary; and
obtaining the corpus entropy based on the frequency and the average length.

10. An electronic device, comprising a computer processor coupled to a computer-readable memory unit, the memory unit comprising instructions that when executed by the computer processor implements operations comprising:
inputting a sequence of token candidates and data indicative of a training corpus into the machine learning model, the sequence of token candidates generated based on a source vocabulary, and the training corpus comprising texts in at least one language;
generating a group of candidate vocabularies at a plurality of timesteps by the machine learning model, the machine learning model is configured to generate optimal vocabularies with a computational efficiency by balancing a corpus entropy and a vocabulary size, wherein a size of a candidate vocabulary in the group of candidate vocabularies is different from a size of the source vocabulary;
computing a group of marginal scores corresponding to the group of candidate vocabularies, respectively, wherein a marginal score in the group of marginal scores corresponding to a candidate vocabulary in the group of candidate vocabularies is computed based on a corpus entropy of the candidate vocabulary and a size of the candidate vocabulary, wherein computing the marginal score comprises computing a negative derivation of the corpus entropy to the size of the candidate vocabulary, and wherein the computing a negative derivation of the corpus entropy to the size of the candidate vocabulary further comprises:
computing an entropy difference between the corpus entropy and a previous corpus entropy of a previous vocabulary, and
computing the negative derivation based on the entropy difference and a predefined step length; and
selecting the destination vocabulary from the group of candidate vocabularies based on the group of marginal scores.

11. The device of claim 10, wherein generating the group of candidate vocabularies comprises:
obtaining a plurality of timesteps for determining the group of candidate vocabularies based on a predefined step length and the size of the source vocabulary;
determining at least one candidate vocabulary in the group of candidate vocabularies in a timestep of the plurality of timesteps, a size of the at least one candidate vocabularies being different from the size of the source vocabulary by the predefined step length.

12. The device of claim 11, wherein determining the at least one candidate vocabulary in the timestep comprises:
selecting a subset of tokens from the source vocabulary based on frequency for tokens included in the source vocabulary occurring in the corpus; and
obtaining the at least one candidate vocabulary by any of:
adding, into a token in the subset of tokens, at least one character included in the corpus; or
removing, from the subset of tokens, at least one character included in the corpus.

13. The device of claim 12, wherein obtaining the at least one candidate vocabulary comprises:
obtaining a character set that includes all characters in the corpus;
generating a transport matrix for determining the least one candidate vocabulary, a first dimension in the transport matrix corresponding to the subset of tokens and a second dimension in the transport matrix corresponding to characters in the character set, and an element at a position in the transport matrix indicating a probability for a character corresponding to the position being transported to a token corresponding to the position; and
obtaining the at least one candidate vocabulary based on the transport matrix and a previous vocabulary that is obtained in a previous timestep before the timestep.

14. The device of claim 13, wherein constrains for the transport matrix comprise at least one of:
a sum of elements in the second dimension corresponds to a probability of a character in the character set; and
a sum of a difference between the element and a probability for a token in the subset of tokens being below a predefined threshold.

15. The device of claim 10, wherein selecting the destination vocabulary comprises:
selecting a plurality of extreme candidate vocabularies for the plurality of timesteps respectively, an extreme candidate vocabulary in the plurality of extreme candidate vocabularies having an extreme corpus entropy among the at least one candidate vocabulary that is obtained in the timestep;
selecting an extreme candidate vocabulary from the plurality of extreme candidate vocabularies, a difference between a corpus entropy of the selected extreme candidate vocabulary and a corpus entropy of a previous extreme candidate vocabulary that is obtained in a previous timestep having an extreme value; and identifying the selected extreme candidate vocabulary as the destination vocabulary.

16. The device of claim 15, wherein selecting the plurality of extreme candidate vocabularies comprises: selecting an extreme candidate vocabulary for the timestep by, generating a distance matrix corresponding to the transport matrix, a first dimension in the distance matrix corresponding to the subset of tokens and a second dimension in the distance matrix corresponding to characters in the character set, and an element at a position in the distance matrix indicating a distance for transporting a character corresponding to the position to a token corresponding to the position; and determining an extreme corpus entropy for the timestep based on the transport matrix and the distance matrix; and selecting a candidate vocabulary that has the extreme corpus entropy as the extreme candidate vocabulary for the timestep.

17. The device of claim 10, wherein generating the group of candidate vocabularies further comprises: removing a token from the candidate vocabulary in response to an element in a transport matrix corresponding to the token being below a predefined threshold.

18. A computer program product, the computer program product comprising a non-transitory computer readable storage medium having program instructions embodied therewith, the program instructions executable by an electronic device to cause the electronic device to perform operations comprises:

inputting a sequence of token candidates and data indicative of a training corpus into the machine learning model, the sequence of token candidates generated based on a source vocabulary, and the training corpus comprising texts in at least one language;

generating a group of candidate vocabularies at a plurality of timesteps by the machine learning model, the machine learning model is configured to generate optimal vocabularies with a computational efficiency by balancing a corpus entropy and a vocabulary size, wherein a size of a candidate vocabulary in the group of candidate vocabularies is different from a size of the source vocabulary;

computing a group of marginal scores corresponding to the group of candidate vocabularies, respectively, wherein a marginal score in the group of marginal scores corresponding to a candidate vocabulary in the group of candidate vocabularies is computed based on a corpus entropy of the candidate vocabulary and a size of the candidate vocabulary, wherein computing the marginal score comprises computing a negative derivation of the corpus entropy to the size of the candidate vocabulary, and wherein the computing a negative derivation of the corpus entropy to the size of the candidate vocabulary further comprises:

computing an entropy difference between the corpus entropy and a previous corpus entropy of a previous vocabulary, and computing the negative derivation based on the entropy difference and a predefined step length; and selecting the destination vocabulary from the group of candidate vocabularies based on the group of marginal scores.

* * * * *